United States Patent
Paller

(10) Patent No.: US 7,297,904 B2
(45) Date of Patent: Nov. 20, 2007

(54) CONVECTION OVEN AND RELATED AIR FLOW SYSTEM

(75) Inventor: Hans Paller, Maple Valley, WA (US)

(73) Assignee: Premark FEG LLC, Wilmington, DE (US)

( * ) Notice: Subject to any disclaimer, the term of this patent is extended or adjusted under 35 U.S.C. 154(b) by 103 days.

(21) Appl. No.: 10/665,947

(22) Filed: Sep. 18, 2003

(65) Prior Publication Data

US 2005/0061795 A1    Mar. 24, 2005

(51) Int. Cl.
*A21B 1/26*  (2006.01)
*A21B 1/44*  (2006.01)
*A21B 1/50*  (2006.01)

(52) U.S. Cl. ............... 219/400; 126/21 A; 99/474

(58) Field of Classification Search ............ 219/400, 219/401, 386; 99/474, 476; 126/21 A; 34/231–233, 34/225
See application file for complete search history.

(56) References Cited

U.S. PATENT DOCUMENTS

| | | | |
|---|---|---|---|
| 3,698,377 A * | 10/1972 | Smith ................ | 126/21 A |
| 3,861,378 A * | 1/1975 | Rhoads et al. ........... | 126/21 A |
| 4,062,983 A * | 12/1977 | Roderick ................ | 426/418 |
| 4,322,204 A * | 3/1982 | Voegtlin et al. ........... | 432/152 |
| 4,357,522 A * | 11/1982 | Husslein et al. ........... | 219/400 |
| 4,387,841 A | 6/1983 | Hawkins | |
| 4,426,923 A * | 1/1984 | Ohata ................ | 99/468 |
| 4,597,193 A * | 7/1986 | Kallfass ................ | 34/231 |
| 4,722,683 A * | 2/1988 | Royer ................ | 126/21 A |
| 4,771,163 A | 9/1988 | Thiboutot | |
| 4,779,604 A * | 10/1988 | Konig ................ | 126/21 A |
| 4,813,398 A * | 3/1989 | Savage ................ | 126/21 A |
| 4,941,824 A | 7/1990 | H ölter et al. | |
| 4,984,557 A * | 1/1991 | Konig ................ | 126/21 A |
| 5,228,385 A * | 7/1993 | Friedrich et al. ........... | 99/352 |
| 5,497,760 A * | 3/1996 | Alden et al. ........... | 126/21 A |
| 5,617,839 A | 4/1997 | Jennings et al. | |
| 5,801,362 A * | 9/1998 | Pearlman et al. ........... | 219/400 |
| 5,816,234 A * | 10/1998 | Vasan ................ | 126/21 A |
| 6,049,995 A | 4/2000 | Rogne et al. | |
| 6,195,909 B1 | 3/2001 | Rogne et al. | |

(Continued)

FOREIGN PATENT DOCUMENTS

AU    4155178    5/1979

(Continued)

*Primary Examiner*—Joseph Pelham
(74) *Attorney, Agent, or Firm*—Thompson Hine LLP

(57) ABSTRACT

A convection oven includes a heat exchanger section and a product receiving section, the product receiving section including a door to provide access thereto. An air flow system includes at least one blower and an air flow path for enabling air to circulate from the heat exchanger section where it is heated, into the product receiving section for transferring heat to food products, and back to the heat exchanger section for further heating. The air flow path includes a passage providing flow communication between the heat exchanger section to the product receiving section, where the passage is located proximate to a wall and configured such that heated air from the heat exchanger section is directed along an internally facing surface of the wall so as to attach to and flow along the internally facing surface of the wall from one side of the product receiving section toward an opposite side of the product receiving section.

15 Claims, 4 Drawing Sheets

U.S. PATENT DOCUMENTS

| | | |
|---|---|---|
| 6,399,930 B2 * | 6/2002 | Day et al. .................. 219/400 |
| 6,564,699 B1 * | 5/2003 | Vincente et al. .............. 99/476 |
| 6,576,030 B2 | 6/2003 | Mullins |
| 6,593,549 B2 | 7/2003 | Stevens |
| 6,854,457 B2 * | 2/2005 | Rabas et al. .............. 126/21 A |
| 6,894,252 B2 * | 5/2005 | Paller et al. ................ 219/400 |
| 2004/0026401 A1 * | 2/2004 | Jones et al. ................ 219/391 |
| 2004/0040950 A1 * | 3/2004 | Carbone et al. ............ 219/400 |
| 2004/0200823 A1 | 10/2004 | Paller et al. |

FOREIGN PATENT DOCUMENTS

| | | |
|---|---|---|
| DE | 2557867 | 6/1977 |
| DE | 4007198 | 10/1991 |

* cited by examiner

CONVECTION OVEN AND RELATED AIR FLOW SYSTEM

TECHNICAL FIELD

The present invention relates generally to convection ovens used for baking items such as bread and, more particularly, to a rack type convection oven having a air flow path that extends from an outlet of a heat exchanger area and along an internal wall of the baking chamber toward an opposite side of the baking chamber where it is then directed away from the internal wall.

BACKGROUND

Rack ovens are generally equipped with a fuel-fed heating element and a fan for moving heated air throughout a baking chamber to provide a rapid distribution of hot air over the food product. Commercial ovens of this type include a baking chamber, which is sized to receive a wheeled rack, or hold an integrated rack, having multiple shelves containing products to be baked; a power driven, rotating mechanism to rotate the product as it is being cooked or baked; a heat exchanger such as one or more gas burners and an exhaust system to eliminate combustion gases or an electrical heating element; and a circulating system for directing hot air along a heated air flow path that passes through the baking chamber. Conventional rack ovens of the type for baking bread also generally include a steam generator for the introduction of steam into the oven for brief periods of time, usually at the beginning of the baking process, to impart a desired appearance to the baked food product.

One embodiment of a convection oven is described in U.S. Pat. No. 5,617,839, where a rack oven includes a heat exchanger comprising a plurality of heat exchange tubes, and a plurality of gas fired in-shot burners, wherein each of the in-shot burners fires into a corresponding heat exchange tube. One or more blowers circulate air past the heat exchange tubes and to the oven baking chamber.

FIGS. 4A and 4B illustrate another PRIOR ART rack oven construction 100 in which a heat exchanger section 102 is positioned alongside the baking chamber 104. The wall 106 separating the baking chamber 104 from the heat exchanger section 102 includes a single, centrally disposed opening 108 having an axial fan 109 positioned therein. The wall 106 also includes louvers 110 towards the sides thereof. The heat exchanger section 102 includes a plurality of horizontally extending, U-shaped exchange tubes 112, with tube segments 120 and 122, are arranged vertically one above the other. When the fan 109 is rotated, air flows from the baking chamber 104, through the opening 108 onto a central section of the heat exchange tubes and then splits in two lateral directions along the heat exchange tubes to be returned to the baking chamber via louvers 110 as best seen by the arrows in FIG. 4A. While the air flow system of the prior art oven of FIGS. 4A and 4B is quite effective, improvements are always sought.

SUMMARY

In one aspect, a rack oven includes a heat exchanger section and a rack receiving section, the rack receiving section including a door to provide access thereto. An air flow system includes at least one blower and an air flow path for enabling air to circulate from the heat exchanger section where it is heated, into the rack receiving section for transferring heat to food products, and back to the heat exchanger section for further heating. The air flow path includes at least one passage from the heat exchanger section to the rack receiving section, where the passage is located proximate to a wall and configured such that heated air from the heat exchanger section is directed along an internally facing surface of the wall so as to attach to and flow along the internally facing surface of the wall from one side of the rack receiving section toward an opposite side of the rack receiving section.

In another aspect, a convection oven includes a heat exchanger section and a product receiving section, the product receiving section including a door to provide access thereto. An air flow system includes at least one blower and an air flow path for enabling air to circulate from the heat exchanger section where it is heated, into the product receiving section for transferring heat to food products, and back to the heat exchanger section for further heating. The air flow path includes a vertical louver system providing flow communication between the heat exchanger section to the product receiving section, where the vertical louver system is located proximate to a wall and configured such that heated air from the heat exchanger section is directed along an internally facing surface of the wall so as to attach to and flow along the internally facing surface of the wall from one side of the product receiving section toward an opposite side of the product receiving section.

In yet another aspect, an a convection oven having a circulating air flow between a heat exchanger section and a product receiving section, the heat exchanger section located to one side of the product receiving section, a method comprises the steps of: effecting a transfer of heated air from the heat exchanger section to a side of the product receiving section opposite the one side by directing heated air along an internally facing surface of a wall of the product receiving section such that the heated attaches to and flows along the internally facing surface of the wall from the one side to the side opposite the one side; and directing the heated air off the wall when it is near the side opposite the one side.

DETAILED DESCRIPTION

In a typical operation of a convection oven containing a steam generator, the oven is pre-heated to a predetermined temperature for a period of time to allow the steam generator to reach a peak temperature for vaporizing water into steam. In one embodiment, the bread or other goods to be baked are loaded onto a wheeled rack and placed in the oven chamber and the oven door is closed. The rack is then lifted off the floor by a lifting device and begins to rotate at a set speed. In another embodiment the rack is integrated with the oven and the goods are positioned on pans that then are loaded into the oven and onto the integrated rack. The steaming process is started by spraying water over the heat accumulating units to produce steam uniformly over the total height of the steam generator. The steam produced infiltrates the entire oven and condenses on the cool surface of the unbaked bread or other goods. At the end of the predetermined steaming period (usually about 10 to 30 seconds), the flow of water to the steam generator is discontinued as bake cycle continues. Prior to baking, a substantial portion of the steam may be exhausted from the baking chamber through a vent opening. During the bake period a fan continuously circulates the heated air throughout the entire system. For additional batches, the procedure is repeated except that it is generally not necessary to pre-heat the oven since the previous baking cycle provides sufficient heat.

Figure 1:
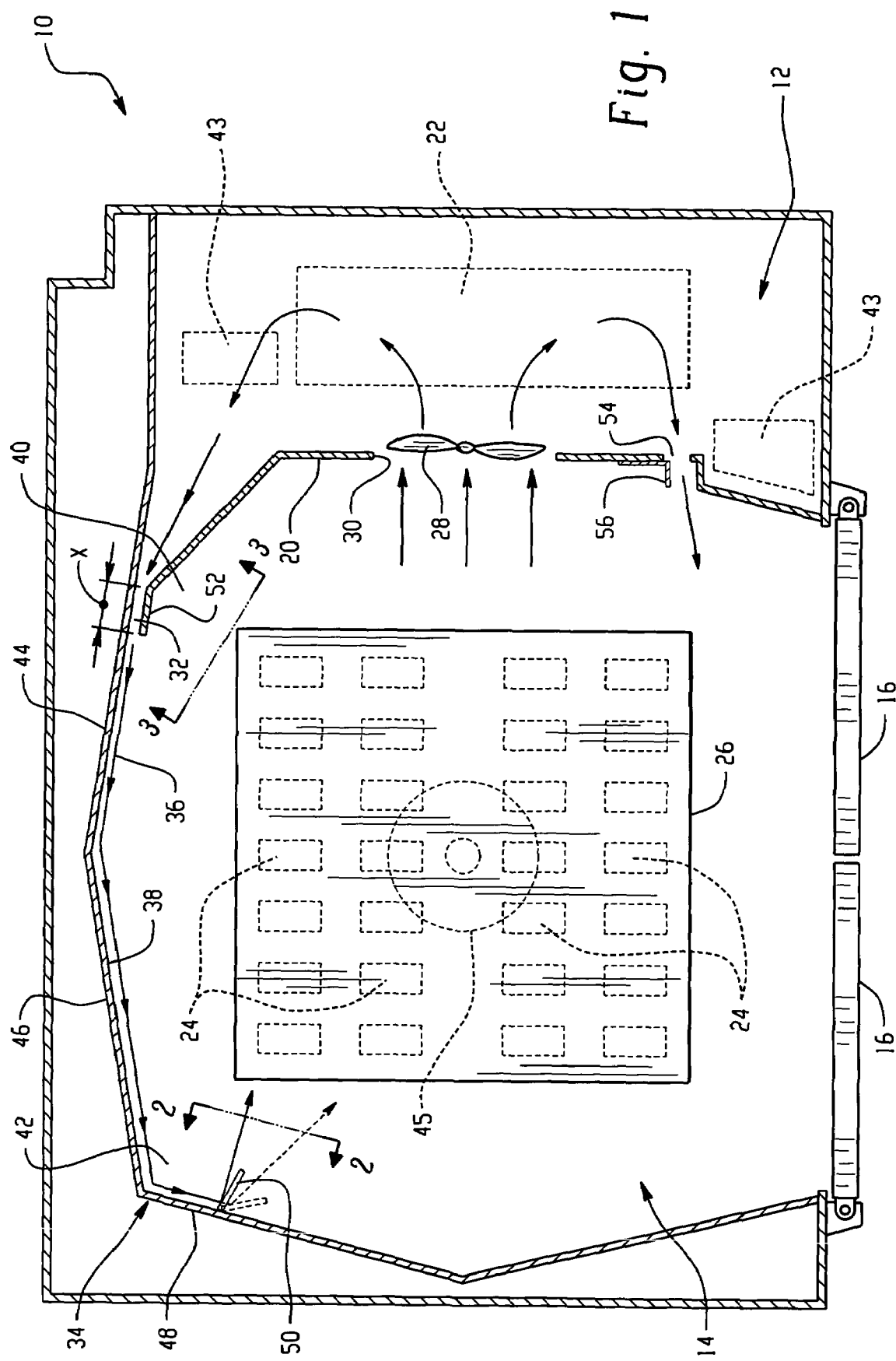
FIG. 1 is a top plan view of one embodiment of a convection oven.

The oven 10 of FIG. 1 includes a heat exchanger section 12 alongside a rack receiving section 14, with doors 16 providing access to the rack receiving section 14 and enabling the rack 26 to be moved into and out of the oven. The rack receiving section 14 may be configured to enable a wheeled rack to be moved into and out of such section. Alternatively, the rack receiving section 14 may contain an integrated rack that is intended to remain in the oven, other than occasional removal for maintenance purposes. A wall or panel 20 separates the rack receiving section 14 from the heat exchanger section 12. The heat exchanger section 12 includes a heat exchanger 22, which may take the form of gas-fired heat exchange tubes, resistive heating elements or any other suitable source of heat over which air can be directed. An air flow system includes at least one blower and an air flow path enabling air to circulate from the heat exchanger section 12 where it is heated, into the rack receiving section 14 for transferring heat to food products (such as food products 24 shown on rack 26), and back to the heat exchanger section 12 for further heating. In the illustrated embodiment the blower takes the form of an axial fan 28 aligned with an opening 30 in wall 20. The air flow path includes at least one passage from the heat exchanger section 12 to the rack receiving section 14, such as illustrated passage 32, where the passage is located proximate to a wall 34 and configured such that heated air 36 from the heat exchanger section 12 is directed along an internally facing surface 38 of the wall so as to attach to and flow along the internally facing surface of the wall from one side 40 of the rack receiving section 14 toward an opposite side 42 of the rack receiving section. The mechanism by which the heated air 36 attaches to the wall is known as the Coanda effect, which can be broadly described as the entrainment of a stream of air along a surface in a manner that the stream tends to remain attached to the surface regardless of the curvature of the surface. The entrained air streams are sometimes referred to as Coanda air flows.

One or more steam generators 43, such as one or more masses of iron, aluminum or other metal with an associated controllable water source may also be provided in the oven 10 if desired, for use as previously mentioned above. In some applications an overhead rack rotation mechanism 45 may be provided as known in the art, while in other applications the mechanism may be excluded.

In the illustrated embodiment the wall 34 is a rear wall of the rack receiving section 14 and the flow of air is from a right side to a left side of the rack receiving section, but it is recognized that variations are possible. As used herein the term "wall" is intended to broadly encompass a boundary structure or combination of boundary structures defining a boundary of the rack receiving section 14. In the illustrated embodiment the wall 34 includes planar sections 44, 46 and 48 that are angled relative to each other. However, the wall could be entirely planar, entirely curved or could be configured with some combination of curved and planar sections.

Figure 2:
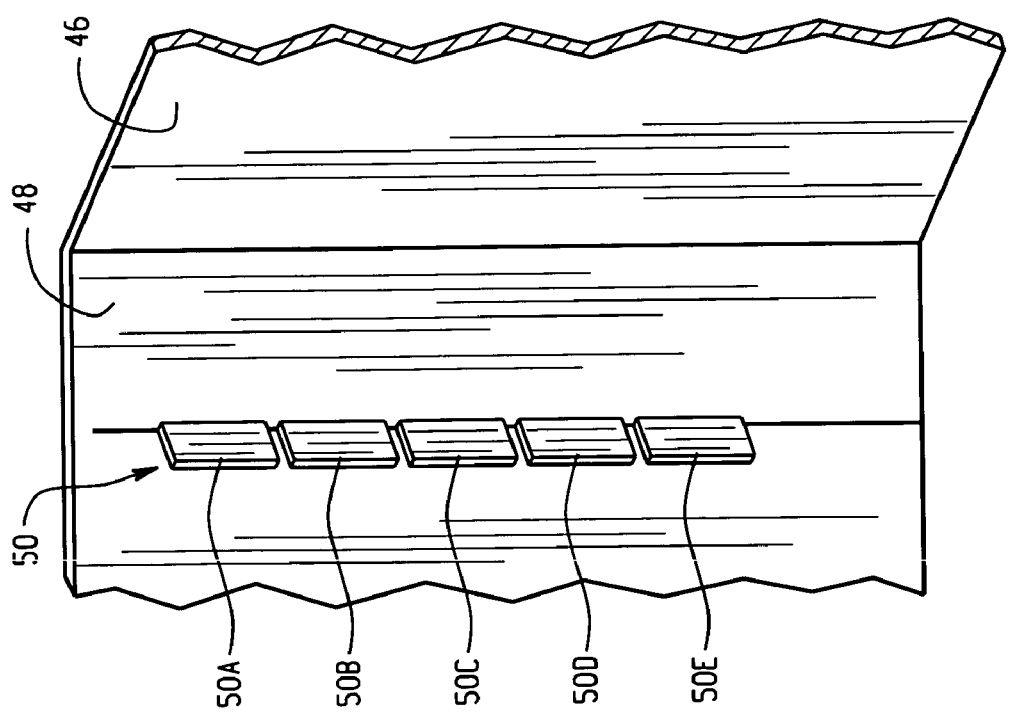
FIG. 2 is an elevation view along line 2-2 of FIG. 1.
Figure 4A:
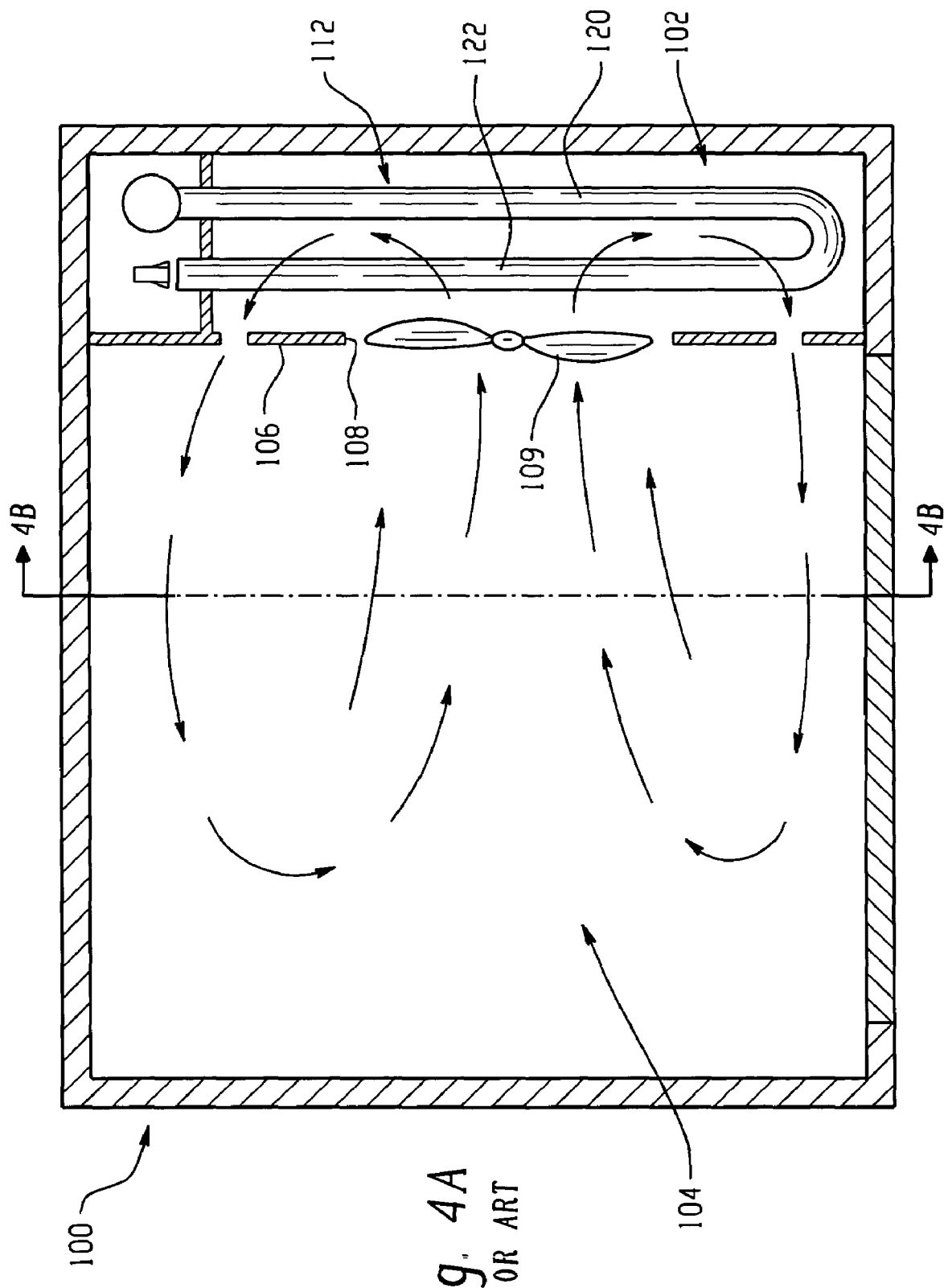
FIG. 4A is a top plan view of a prior art rack oven.
Figure 4B:
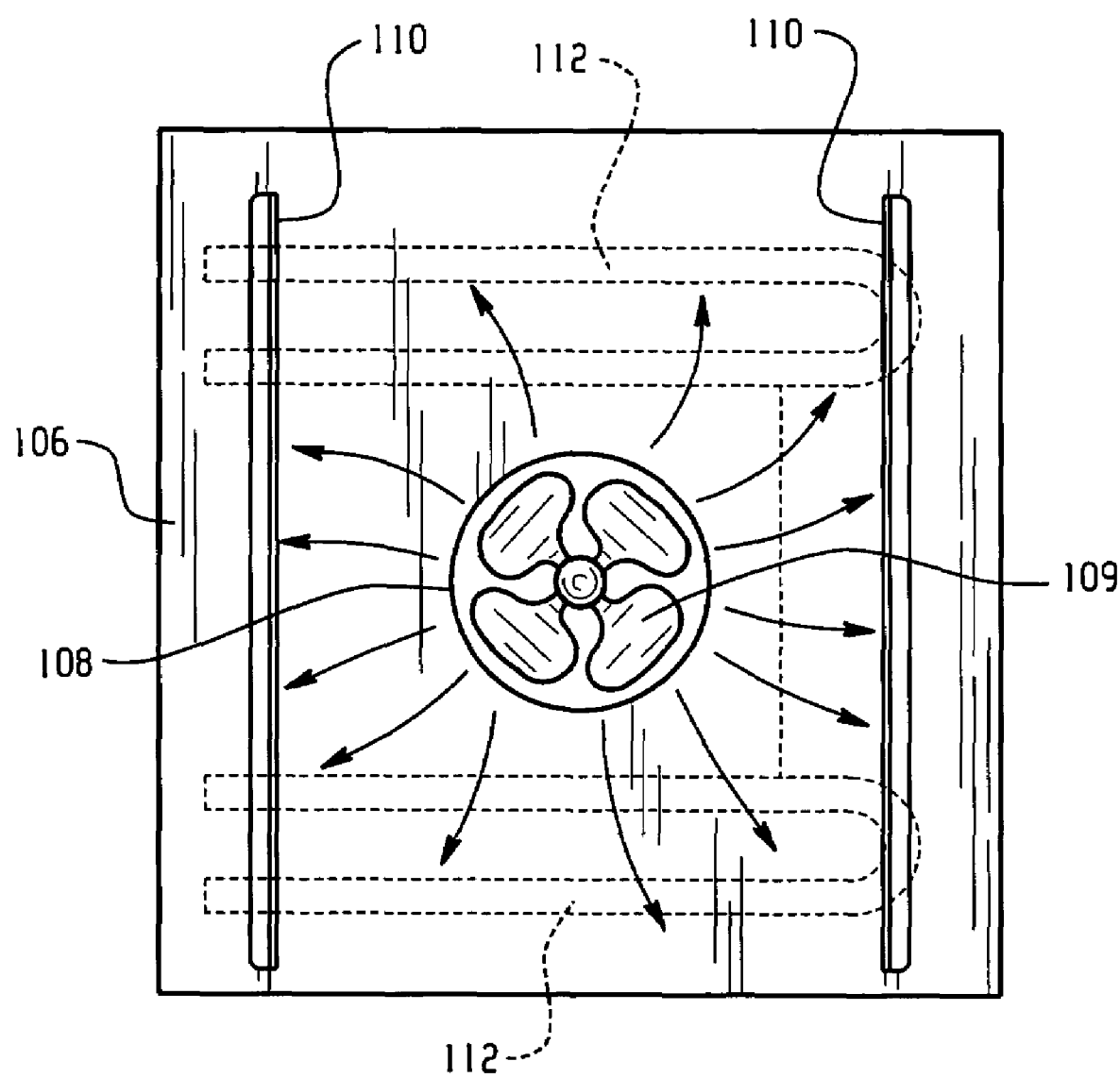
FIG. 4B is a partial side view along line 7B-7B of FIG. 7A.

The purpose of employing the Coanda air flow in the oven along wall 34 is to prevent significant amounts of heated air from short circuiting from the passage 32 back to the opening 30, as it is desirable to assure that a suitable portion of the heated air from the heat exchanger section 12 reaches the far side 42 of the rack receiving section 14, and the far side of the rack 26, to provide more even baking of food products 24 on the rack 26. In one implementation, the heated air from the heat exchanger section attaches to and flows along the internally facing surface of the wall 34 for a travel distance of at least two-thirds of a total distance from the passage 32 to the far side 42 of the rack receiving section. A deflector 50 may be provided to direct the heated air off the wall 34 and toward the food product rack 26. In one implementation the deflector 50 is adjustable relative to the wall section 48 to vary the angle at which the heated air is directed on the rack 26. Referring to FIG. 2, the deflector may be formed by a plurality of vertically distributed adjustable deflectors 50A-50E, enabling different deflection directions to be utilized at different heights if needed for a more uniform baking of the food products. By way of example, the deflectors 50A-50E may be formed by bendable sheet metal panels or by sheet metal panels that are pivotally mounted to the wall section 48.

Figure 3:
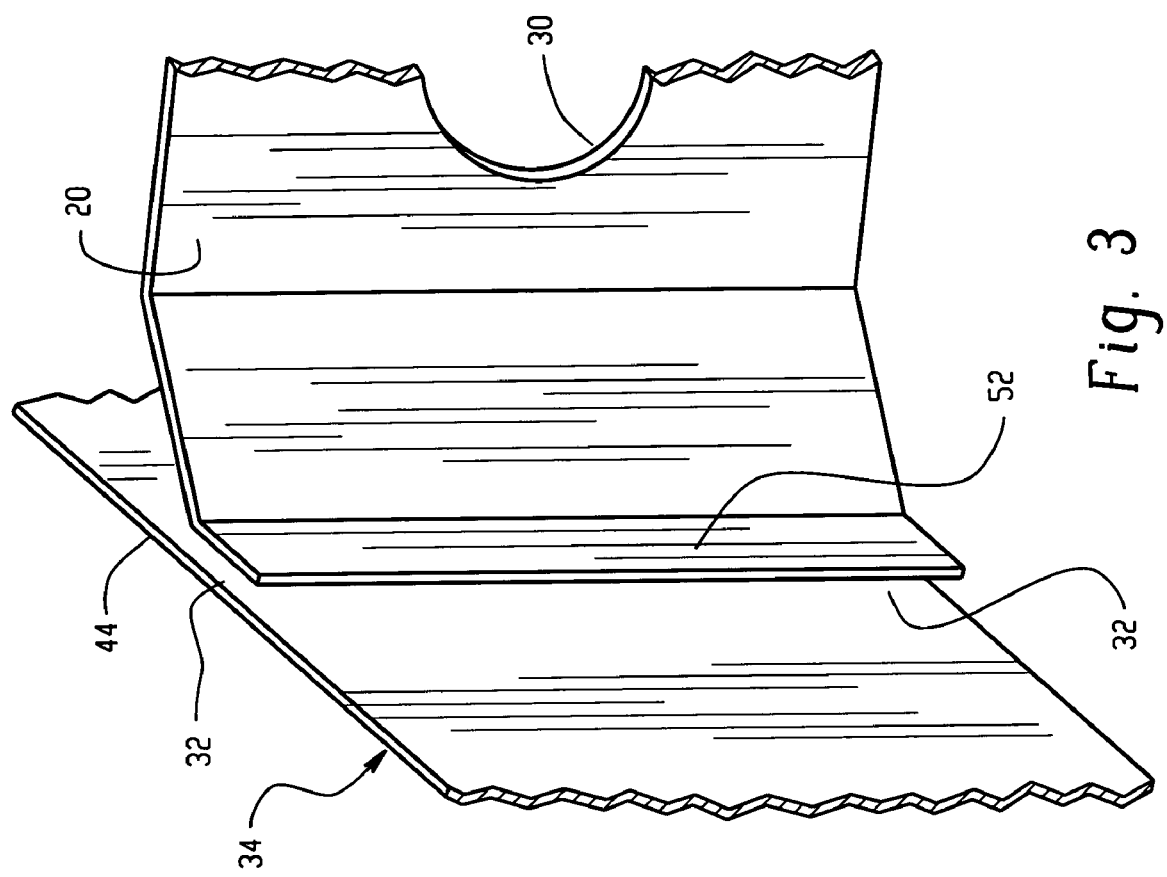
FIG. 3 is an elevation view along line 3-3 of FIG. 1.

Referring to FIGS. 1 and 3, in the illustrated embodiment the passage opening 32 is formed as a vertically oriented slot adjacent the wall 34. The slot is formed adjacent the internally facing surface of the wall 34 and includes a vane 52 that overlaps with the internally facing surface of the wall 5. A distance X of overlap of the vane and the internally facing surface of the wall may be at least one inch, and in one implementation is about two inches. In one implementation, a spacing between the wall 34 and the vane 52 may be in the range of about 0.25 inches to about 0.75 inches, although variations are possible. In one exemplary oven construction, the internal height of the rack receiving section of the oven is in a range of about 2.5 to 4 feet and air is moved through the oven by the blower at a rate in the range of about 400-600 cubic feet per minute, with approximately ½ of the air moved through the opening 32 and the other half through opening or passage 54 mentioned below. Variations in such dimensions and air flows are possible and contemplated.

As shown in the illustrated embodiment, an additional passage 54 from the heat exchanger section 12 to the rack receiving section 14 may be located on the separating wall 20 toward a front part of the oven, and may include an adjustable shutter mechanism or mechanisms 56. Passage 54 may be a single vertical slot or multiple openings or slots.

The above-mentioned oven structure provides a method comprising the steps of: effecting a transfer of heated air from a heat exchanger section to a side of a product receiving section opposite the one side by directing heated air along an internally facing surface of a wall of the product receiving section (e.g., the rack receiving section in the case of a rack oven) such that the heated air attaches to and flows along the internally facing surface of the wall from the one side to the side opposite the one side; and directing the heated air off the wall when it is near the side opposite the one side It is to be clearly understood that the above description is intended by way of illustration and example only and is not intended to be taken by way of limitation. For example, while the illustrated embodiment directs the Coanda air flow along the wall at the rear side of the oven, such a flow could be directed at other locations, such as any one of the right, left, front, top or bottom sides of the oven. Various other changes and modifications could be made.

What is claimed is:

1. A rack oven, comprising:
a heat exchanger section and a rack receiving section, the rack receiving section including a door to provide access thereto; and
an air flow system including at least one blower and an air flow path for enabling air to circulate from the heat exchanger section where it is heated, into the rack receiving section for transferring heat to food products, and back to the heat exchanger section for further heating, wherein the air flow path includes at least one passage from the heat exchanger section to the rack receiving section, where the passage is located proximate to a wall that includes an internally facing surface exposed to a rack receiving location of the rack receiving section and configured such that heated air from the heat exchanger section is directed along the internally facing surface of the wall so as to attach to and flow along the internally facing surface of the wall from one side of the rack receiving section toward an opposite side of the rack receiving section;
wherein the at least one passage comprises at least one vertically extending slot, wherein the vertically extending slot is formed adjacent the internally facing surface of the wall and includes a vane that overlaps with the internally facing surface of the wall;
wherein a distance of overlap of the vane and the internally facing surface of the wall is at least about two inches.

2. The rack oven of claim 1 wherein a spacing between the wall and the vane is in the range of about 0.25 inches to about 0.75 inches.

3. The rack oven of claim 1 further comprising an overhead rack rotating mechanism located within the rack receiving section.

4. The rack oven of claim 1 wherein the heated air from the heat exchanger section attaches to and flows along the internally facing surface of the wall for a travel distance of at least two-thirds of a total distance from the passage to the opposite side of the rack receiving section.

5. A rack oven, comprising:
a heat exchanger section and a rack receiving section, the rack receiving section including a door to provide access thereto;
an air flow system including at least one blower and an air flow path for enabling air to circulate from the heat exchanger section where it is heated, into the rack receiving section for transferring heat to food products, and back to the heat exchanger section for further heating, wherein the air flow path includes at least one passage from the heat exchanger section to the rack receiving section, where the passage is located proximate to a wall that includes an internally facing surface exposed to a rack receiving location of the rack receiving section and configured such that heated air from the heat exchanger section is directed along the internally facing surface of the wall so as to attach to and flow along the internally facing surface of the wall from one side of the rack receiving section toward an opposite side of the rack receiving section; and
an air deflector positioned toward the opposite side of the rack receiving section to direct the heated air off of the wall.

6. A rack oven, comprising:
a heat exchanger section and a rack receiving section, the rack receiving section including a door to provide access thereto;
an air flow system including at least one blower and an air flow path for enabling air to circulate from the heat exchanger section where it is heated, into the rack receiving section for transferring heat to food products, and back to the heat exchanger section for further heating, wherein the air flow path includes at least one passage from the heat exchanger section to the rack receiving section, where the passage is located proximate to a wall and configured such that heated air from the heat exchanger section is directed along an internally facing surface of the wall so as to attach to and flow along the internally facing surface of the wall from one side of the rack receiving section toward an opposite side of the rack receiving section; and
an air deflector positioned toward the opposite side of the rack receiving section to direct the heated air off of the wall, wherein the deflector comprises at least one adjustable deflector.

7. The rack oven of claim 6 wherein the deflector comprises a plurality of vertically distributed adjustable deflectors.

8. A rack oven, comprising:
a heat exchanger section and a rack receiving section, the rack receiving section including a door to provide access thereto;
an air flow system including at least one blower and an air flow path for enabling air to circulate from the heat exchanger section where it is heated, into the rack receiving section for transferring heat to food products, and back to the heat exchanger section for further heating, wherein the air flow path includes at least one passage from the heat exchanger section to the rack receiving section, where the passage is located proximate to a wall that includes an internally facing surface exposed to a rack receiving location of the rack receiving section and configured such that heated air from the heat exchanger section is directed along the internally facing surface of the wall so as to attach to and flow along the internally facing surface of the wall from one side of the rack receiving section toward an opposite side of the rack receiving section; and
a rack positioned within the rack receiving section, wherein the heated air from the heat exchanger section attaches to and flows along the internally facing surface of the wall and is deflected off of the wall by a deflector onto a portion of the rack spaced away from the passage.

9. The rack oven of claim 8 wherein the rack is integrated with the oven.

10. The rack oven of claim 8 wherein the rack comprises a wheeled rack that is capable of movement into and out of the oven.

11. A convection oven, comprising:
a heat exchanger section and a product receiving section, the product receiving section including a door to provide access thereto;
an air flow system including at least one blower and an air flow path for enabling air to circulate from the heat exchanger section where it is heated, into the product receiving section for transferring heat to food products, and back to the heat exchanger section for further heating, wherein the air flow path includes at least one passage providing flow communication between the heat exchanger section to the product receiving section, where the passage is located proximate to a wall that includes an internally facing surface exposed to a rack receiving location of the rack receiving section and configured such that heated air from the heat exchanger section is directed along the internally facing surface of the wall so as to attach to and flow along the internally facing surface of the wall from one side of the product receiving section toward an opposite side of the product receiving section; and an air deflector positioned toward the opposite side of the product receiving section to direct the heated air away from the wall.

12. A convection oven, comprising:

a heat exchanger section and a product receiving section, the product receiving section including a door to provide access thereto;

an air flow system including at least one blower and an air flow path for enabling air to circulate from the heat exchanger section where it is heated, into the product receiving section for transferring heat to food products, and back to the heat exchanger section for further heating, wherein the air flow path includes a passage providing flow communication between the heat exchanger section to the product receiving section, where the passage is located proximate to a wall and configured such that heated air from the heat exchanger section is directed along an internally facing surface of the wall so as to attach to and flow along the internally facing surface of the wall from one side of the product receiving section toward an opposite side of the product receiving section; and an air deflector positioned toward the opposite side of the product receiving section to direct the heated air away from the wall, wherein the deflector comprises at least one adjustable deflector.

13. The convection oven of claim 12 wherein the deflector comprises a plurality of vertically distributed adjustable deflectors.

14. In a convection oven having a circulating air flow between a heat exchanger section and a product receiving section, the heat exchanger section located to one side of the product receiving section, a method comprising the steps of:

effecting a transfer of heated air from the heat exchanger section to a side of the product receiving section opposite the one side by directing heated air along an internally facing surface of a wall of the product receiving section such that the heated attaches to and flows along the internally facing surface of the wall from the one side to the side opposite the one side, where the internally facing surface of the wall is exposed to a rack receiving location of the rack receiving section; and directing the heated air away from the wall when the heated air is near the side opposite the one side;

a deflector extends from the wall to direct the heated air off the wall.

15. In a convection oven having a circulating air flow between a heat exchanger section and a product receiving section, the heat exchanger section located to one side of the product receiving section, a method comprising the steps of:

effecting a transfer of heated air from the heat exchanger section to a side of the product receiving section opposite the one side by directing heated air along an internally facing surface of a wall of the product receiving section such that the heated attaches to and flows along an internally facing surface of the wall from the one side to the side opposite the one side; and directing the heated air away from the wall when the heated air is near the side opposite the one side;

a deflector extends from the wall to direct the heated air off the wall, including the further step of adjusting an orientation of the deflector relative to the wall.

* * * * *

UNITED STATES PATENT AND TRADEMARK OFFICE
CERTIFICATE OF CORRECTION

| | | |
|---|---|---|
| PATENT NO. | : 7,297,904 B2 | Page 1 of 2 |
| APPLICATION NO. | : 10/665947 | |
| DATED | : November 20, 2007 | |
| INVENTOR(S) | : Hans Paller | |

It is certified that error appears in the above-identified patent and that said Letters Patent is hereby corrected as shown below:

Claim 1, Col. 5, Line 14 after "surface" insert --directly--

Claim 1, Col. 5, Line 16 after "section" insert --without an intervening wall--

Claim 5, Col. 5, Line 53 after "surface" insert --directly--

Claim 5, Col. 5, Line 55 after "section" insert --without an intervening wall--

Claim 8, Col. 6, Line 34 after "surface" insert --directly--

Claim 8, Col. 6, Line 36 after "section" insert --without an intervening wall--

Claim 11, Col. 6, Line 66 after "surface" insert --directly--

Claim 11, Col. 6, Line 67 after "section" insert --without an intervening wall--

Claim 14, Col. 8, Line 10 after "is" insert --directly--

UNITED STATES PATENT AND TRADEMARK OFFICE
CERTIFICATE OF CORRECTION

PATENT NO.         : 7,297,904 B2
APPLICATION NO. : 10/665947
DATED               : November 20, 2007
INVENTOR(S)       : Hans Paller It is certified that error appears in the above-identified patent and that said Letters Patent is hereby corrected as shown below:

Claim 14, Col. 8, Line 12 after "section" insert --without an intervening wall--

Claim 14, Col. 8, Line 7 after "heated" insert --air--

Claim 15, Col. 8, Line 27 after "heated" insert --air--

Signed and Sealed this

Eighth Day of July, 2008

JON W. DUDAS
*Director of the United States Patent and Trademark Office*